United States Patent [19]
Moore, Jr.

[11] Patent Number: 5,619,590
[45] Date of Patent: Apr. 8, 1997

[54] SYSTEM FOR ELECTRONIC IMAGE SIGNAL PROCESSING TO PROVIDE A TONESCALE CORRECTED FULL RESOLUTION LUMINANCE AND TWO HALF RESOLUTION CHROMINANCE SIGNALS

[75] Inventor: Leslie G. Moore, Jr., Webster, N.Y.

[73] Assignee: Eastman Kodak Company, Rochester, N.Y.

[21] Appl. No.: 318,923

[22] Filed: Oct. 6, 1994

[51] Int. Cl.⁶ ........................................ G06K 9/00
[52] U.S. Cl. .................... 382/162; 358/527; 358/524
[58] Field of Search ............................ 382/162, 166, 382/167; 348/234, 663, 712, 713, 391, 396; 358/515, 518, 520, 527, 524; H04N 1/56, 1/64, 9/64, 11/02

[56] References Cited

U.S. PATENT DOCUMENTS

| | | | |
|---|---|---|---|
| 4,918,523 | 4/1990 | Simon et al. | 348/396 |
| 4,969,204 | 11/1990 | Melnychuck et al. | 382/240 |
| 4,982,270 | 1/1991 | Tanaka et al. | 348/396 |
| 5,023,711 | 6/1991 | Erhardt | 358/506 |
| 5,045,932 | 9/1991 | Sharman et al. | 358/527 |
| 5,060,061 | 10/1991 | Shishido et al. | 358/506 |
| 5,081,529 | 1/1992 | Collette | 358/504 |
| 5,255,081 | 10/1993 | Miyamoto et al. | 348/234 |
| 5,262,847 | 11/1993 | Rodriguez et al. | 348/552 |
| 5,377,025 | 12/1994 | Spaulding et al. | 358/518 |

FOREIGN PATENT DOCUMENTS 2-82789  3/1990  Japan ..................... H04N 11/20

OTHER PUBLICATIONS

Eastman Kodak Company, A Planning Guide For Developers, 1992, pp. 1–37.

*Primary Examiner*—Andrew Johns
*Attorney, Agent, or Firm*—David M. Woods

[57] ABSTRACT

A system for electronic image signal processing is described for use in a system including high speed film scanning apparatus and residual based hierarchical storage and display apparatus wherein full resolution luminance and half resolution color signals are processed to directly generate tonescale corrected full resolution scene luminance signal for image encoding without the creation of full resolution intermediate RGB images.

35 Claims, 7 Drawing Sheets

SYSTEM FOR ELECTRONIC IMAGE SIGNAL PROCESSING TO PROVIDE A TONESCALE CORRECTED FULL RESOLUTION LUMINANCE AND TWO HALF RESOLUTION CHROMINANCE SIGNALS

FIELD OF THE INVENTION

This invention relates to electronic imaging and more particularly to signal processing for providing luminance and chrominance information compatible with hybrid residual-based hierarchical storage and display apparatus for high resolution digital images.

BACKGROUND OF THE INVENTION

In the art of electronic imaging, particularly in the special application of film scanning, digitizing and storage, film images are scanned to produce a data output representative of the red, green, and blue (RGB) image signals. Such a scanner is disclosed in U.S. Pat. No. 5,045,932.

The scanning apparatus disclosed in U.S. Pat. No. 5,045,932 includes two types of linear array sensors. One is a full resolution imager spectrally sensitive to "luminance" like information, referred to as a full resolution luminance sensor. The other is a lower resolution tri-linear imager spectrally sensitive to red, green, and blue (RGB) image information, referred to as a half resolution tri-linear RGB sensor. A line being scanned is imaged onto the array through a beam splitter. Luminance information is generated by spectrally tailoring luminance channel sensitivity to approximate luminance. The luminance sensor "sees" light from red, green, and blue channels.

Scene luminance tonescale information is not provided by the luminance sensor. Signal processing is described which interpolates the color data up to full resolution, extracts detail information from the luminance channel, and adds the detail information to each of the R, G, B channels to form full resolution RGB scanned data. The RGB data is interpolated up to full resolution before processing, and the luminance sensor is used to generate detail information only. This full resolution RGB data can be further converted to luminance, chrominance (YCC) data through the use of look-up tables and color matrices. It is known to use a linear matrix to convert the full resolution RGB information to obtain luminance, chrominance information. Because the scanned luminance channel is formed in film transmission space, independent of the RGB sensor, the luminance channel provides image detail with incorrect scene tonescale information. In addition, the full resolution chrominance output must be subsampled for use in certain residual-based hierarchical storage and display devices.

Typically, the scanned data signals are compressed by known methods such as described in U.S. Pat. No. 4,969,204 to reduce storage requirements which provide for image decomposition and recomposition and make available reduced resolution versions of an original image for quick display. The method disclosed in U.S. Pat. No. 4,969,204 makes use of a full resolution luminance, Y, and two low resolution chrominance $C_1C_2$ signals to encode an image in a more efficient color space than that using RGB signals.

This hierarchical image decomposition system accepts corrected, full resolution luminance and full resolution chrominance data as an input and provides a hierarchical family of reduced resolution image files as output. Chrominance data is subsampled by 2X before processing as full resolution chrominance is not stored or retained. The system recomposes an image for display by converting the YCC data back to RGB space through the use of look-up tables and matrices. Therefore the luminance data must carry tonescale information.

Scanning systems as in U.S. Pat. No. 5,045,932 and color space conversion systems as in the U.S. Pat. No. 4,969,204 can be used in combination to produce a $YC_1C_2$ signal for hierarchical image compression. However, this process is overly complex because it scans with full resolution luminance and low resolution RGB sensors, converts the data to full resolution RGB, then converts the full resolution RGB to subsampled chrominance and full resolution luminance. In addition, such processed luminance information for encoding does not provide the same tonescale as luminance information generated from tonescale corrected RGB data.

SUMMARY OF THE INVENTION

The present invention overcomes the tonescale deficiency found in conventional signals by correcting the full resolution scanned luminance information by incorporating tonescale luminance information processed from the half resolution RGB signal. Additionally, the decomposition process used in hybrid residual-based hierarchical storage and display systems can be modified to accommodate the scanned luminance information without passing inaccurate tonescale information.

The invention provides systems for generating an imaging signal having a full resolution luminance, Y, data component with accurate scene tonescale information and two half resolution chrominance components, $C_1C_2$. This chrominance data does not have to be subsampled, because it is scanned at half resolution and is directly useable in conventional image decomposition systems. Additionally, the invention provides systems for encoding full resolution luminance, Y, data for image decomposition. This luminance data may or may not be color corrected and is directly useable in known image decomposition systems.

These and other features and advantages of the invention will be more fully understood from the following description of certain specific embodiments of the invention taken together with the accompanying drawings.

DETAILED DESCRIPTION OF THE INVENTION

Referring to FIGS. 1–7, various systems or embodiments are described for processing luminance and color signals generated by known scanning apparatus, which generate a full resolution scanned luminance signal and half resolution color (RGB) signals, to provide tonescale correct full resolution luminance, Y, two half resolution chrominance signals, $C_1C_2$, and a half resolution tonescale correct luminance signal that can be encoded and digitally processed in known hybrid residual-based hierarchial storage and display apparatus, wherein digital images are compressed for storage and reconstructed for display, hereinafter referred to as storage and display apparatus or systems. These systems teach the generation of the preferred $YC_1C_2$ signals without the complicated conversion (through the use of look-up tables and color matrices) of full resolution RGB data. Therefore these hereinafter disclosed systems require reduced data rates and storage capacity of the order of one half that of known systems.

Figure 1:
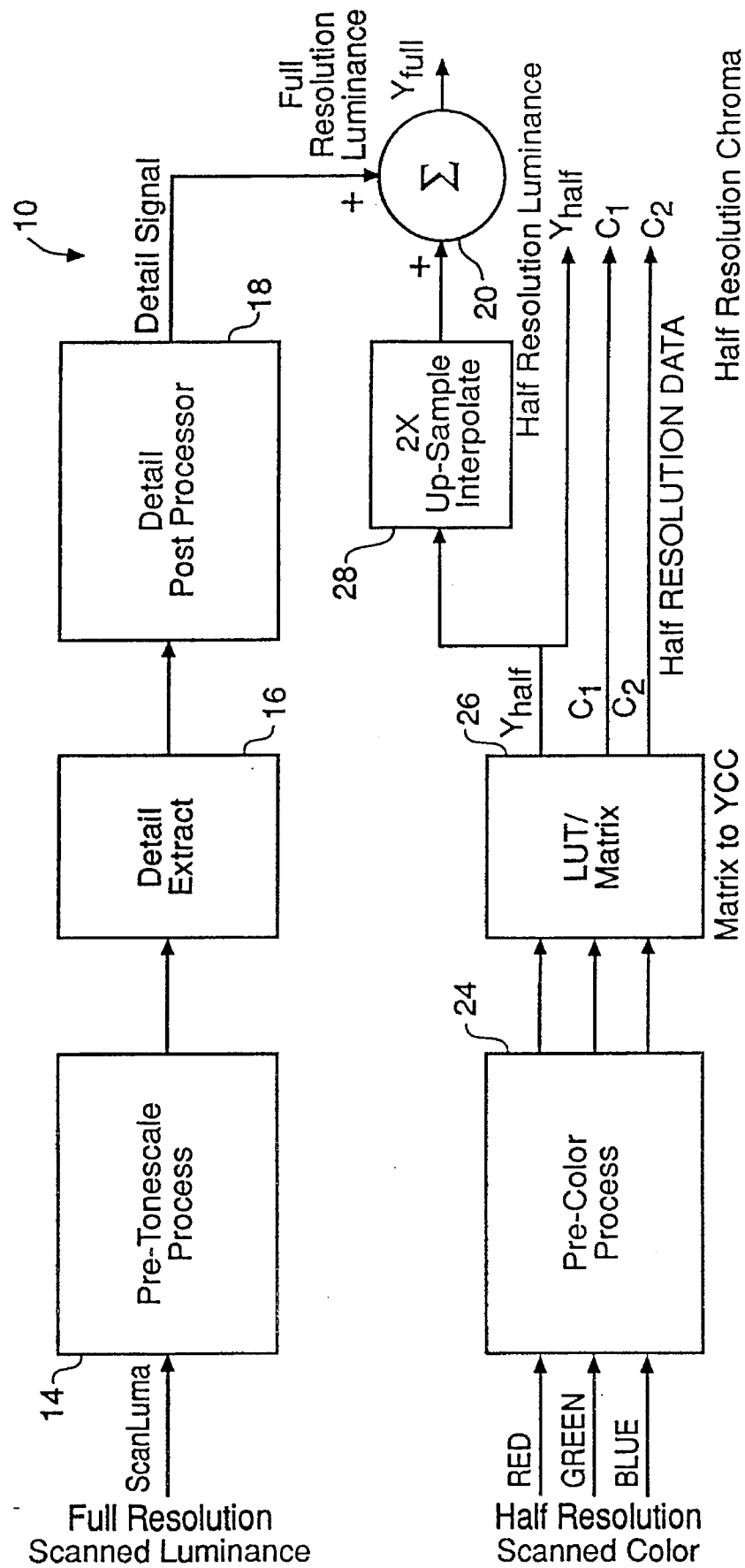
FIG. 1 is a block diagram of a signal processing system in accordance with one embodiment of the invention.

In FIG. 1, a system in accordance with a first embodiment of the invention is referred to by reference numeral 10. A scanned full resolution luminance signal received from scanning apparatus, not shown, is conducted through a pre-tonescale processor 14 for tonescale correction. The tonescale correction may include but is not limited to tonescale curve shaping and gamma correction both of which are known in the art. The full resolution luminance signal is passed through a detail extraction apparatus 16 which includes a digital filter where detail/sharpness information is extracted from the luminance data. Various conventional filtering techniques can be used. Filtered luminance data is conducted through a post processor 18 for signal enhancement such as to correct sharpening; for instance, by using a coring operation. The resulting detail signal is then conducted to combiner apparatus 20 as hereinafter more fully described.

Scanned half resolution RGB color signals received from scanning apparatus, not shown, are conducted through a pre-color processor 24 to optionally shape or modify tonescale. A color conversion apparatus 26 including look-up tables and a conversion matrix converts the scanned half resolution color signals into a half resolution tonescale correct luminance, Y, signal and two half resolution chrominance, $C_1C_2$, signals. The half resolution Y signal is conducted to an interpolator apparatus 28 that interpolates the half resolution Y signal to full resolution.

Combiner apparatus 20 receives the interpolated luminance signal and adds it to the tonescale modified luminance detail signal. The resulting luminance, Y, output has the tonescale characteristics of the RGB sensor system as known systems do, as the luminance tonescale is derived from RGB signals, and the sharpness of the full resolution scanned luminance. Y is full resolution; and the two chrominance channels, $C_1C_2$, are half resolution. These $YC_{12}$ signals are compatible with known methods of image compression and image recomposition.

This system has the scanning speed advantages of the luma/RGB scanner and provides full resolution luminance and half resolution chrominance signals, compatible with known storage and display apparatus, with a reduced amount of hardware.

Figure 2:
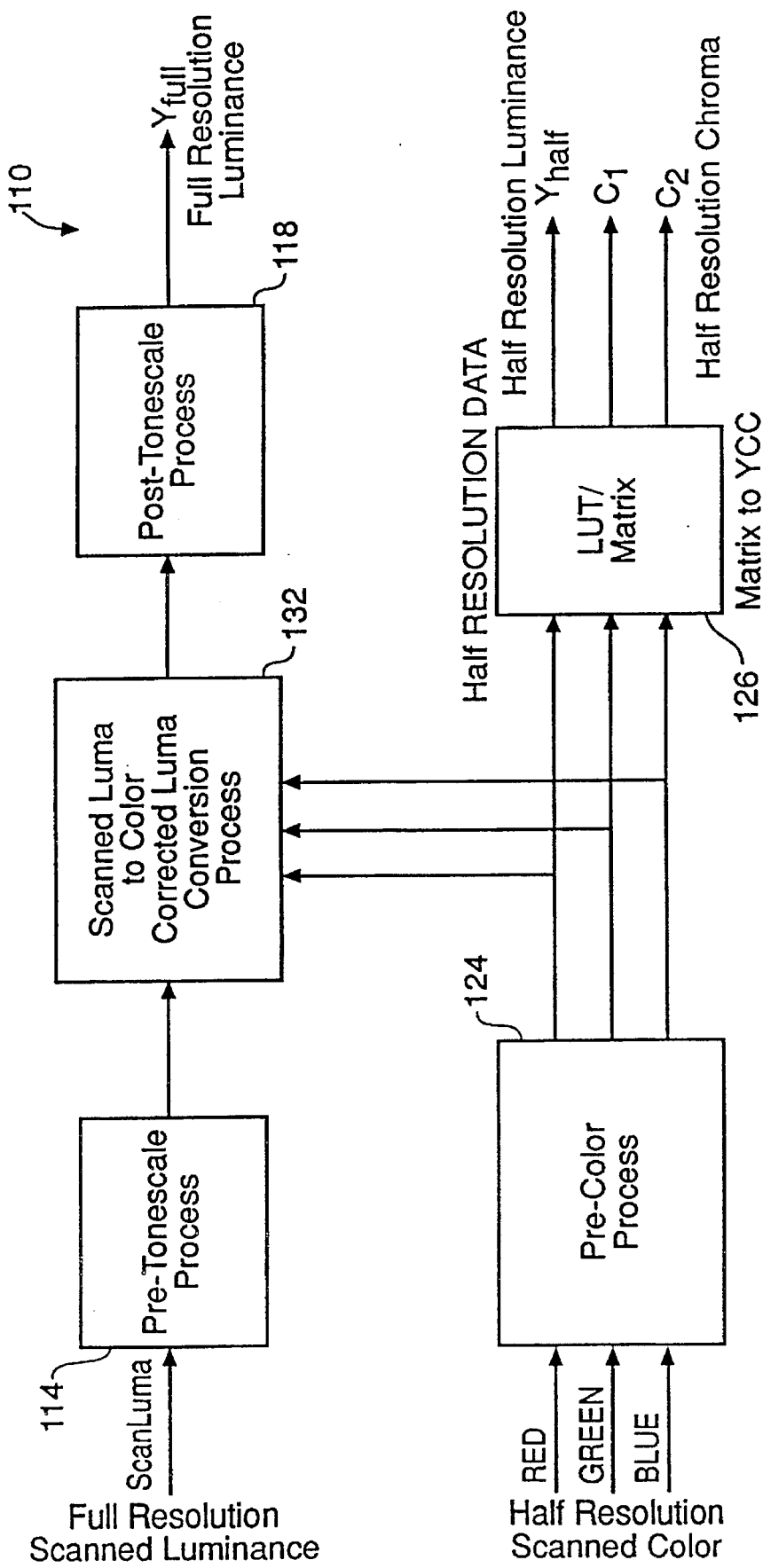
FIG. 2 is a block diagram of a signal processing system in accordance with another embodiment of the invention.

FIG. 2 illustrates a second system in accordance with a second embodiment of the invention referred to as 110. In this embodiment, the scanned full resolution luminance signal is conducted through a pre-tonescale processor 114 for tonescale correction as hereinabove described. A converter apparatus 132 including a luminance conversion matrix receives the scanned full resolution luminance signal and also the scanned half resolution color signals. The half resolution color signals have been processed through a pre-color processor 124 to shape or modify tonescale. The conversion matrix consists of four multipliers and three adders. This luminance output Y of the converter 132 is equal to a weighted linear combination of red, green, blue, and scanned luminance signal inputs.

The luminance output of the converter 132 is received by a post processor 118, for tonescale shaping which may include gamma correction, and the outputted full resolution luminance Y signal has been corrected for tonescale and spectral errors. A color conversion apparatus 126, as hereinabove described, generates a half resolution tonescale correct luminance signal and two half resolution chrominance signals. The converted full resolution Y signal and half resolution chrominance signals are compatible with known storage and display apparatus.

This system has the speed advantages of the luma/RGB scanner, and tonescale corrects the full resolution luminance signal with a reduced amount of hardware.

Figure 3:
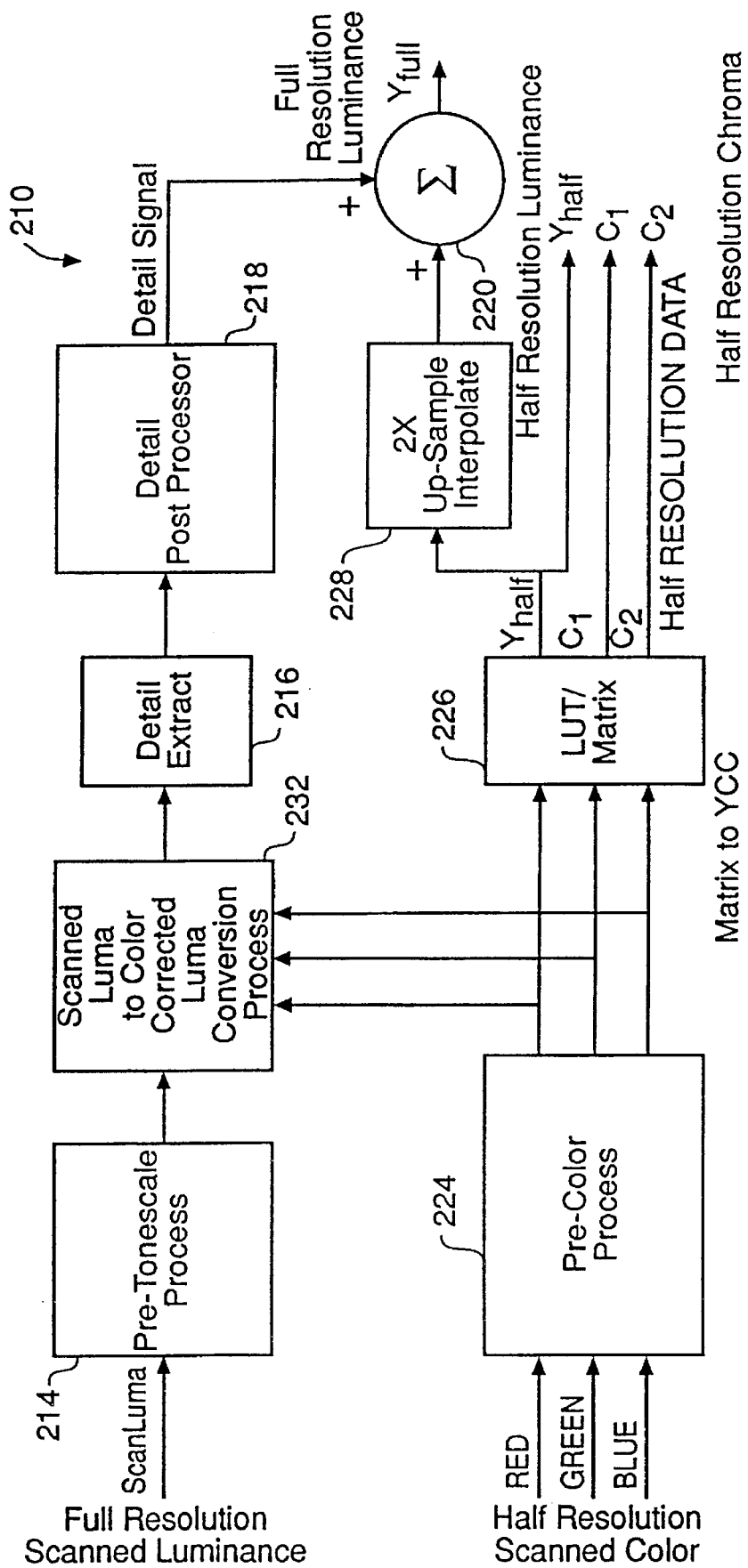
FIG. 3 is a block diagram of a signal processing system in accordance with yet another embodiment of the invention.

The luminance tonescale provided by low resolution RGB signals found in the first embodiment of FIG. 1 and the modified scanned luminance data found in second embodiment of FIG. 2, are combined in the system of FIG. 3 to illustrate a third embodiment of the invention 210. In this embodiment, the scanned luminance signals are passed through pre-tonescale processor 214, converted through a converter apparatus 232, as hereinabove described, passed through detail extraction apparatus 216, and optionally through post processor 218, as hereinabove described, to provide the tonescale corrected detail signal.

The half resolution color signals or channels are converted through color conversion apparatus 226, as hereinabove described, and the half resolution tonescale correct Y signal output of the converter is conducted through interpolator apparatus 228 and brought up to full resolution.

Combiner apparatus 230, as hereinabove described, adds the interpolated luminance signal and the tonescale corrected luminance signal to provide the Y output component.

This system 210 has improved signal reproduction over systems 10, 110 as the result of using the matrix in 232 to correct scanned luminance and the detail extraction filter 216 to extract image sharpness.

Figure 4:
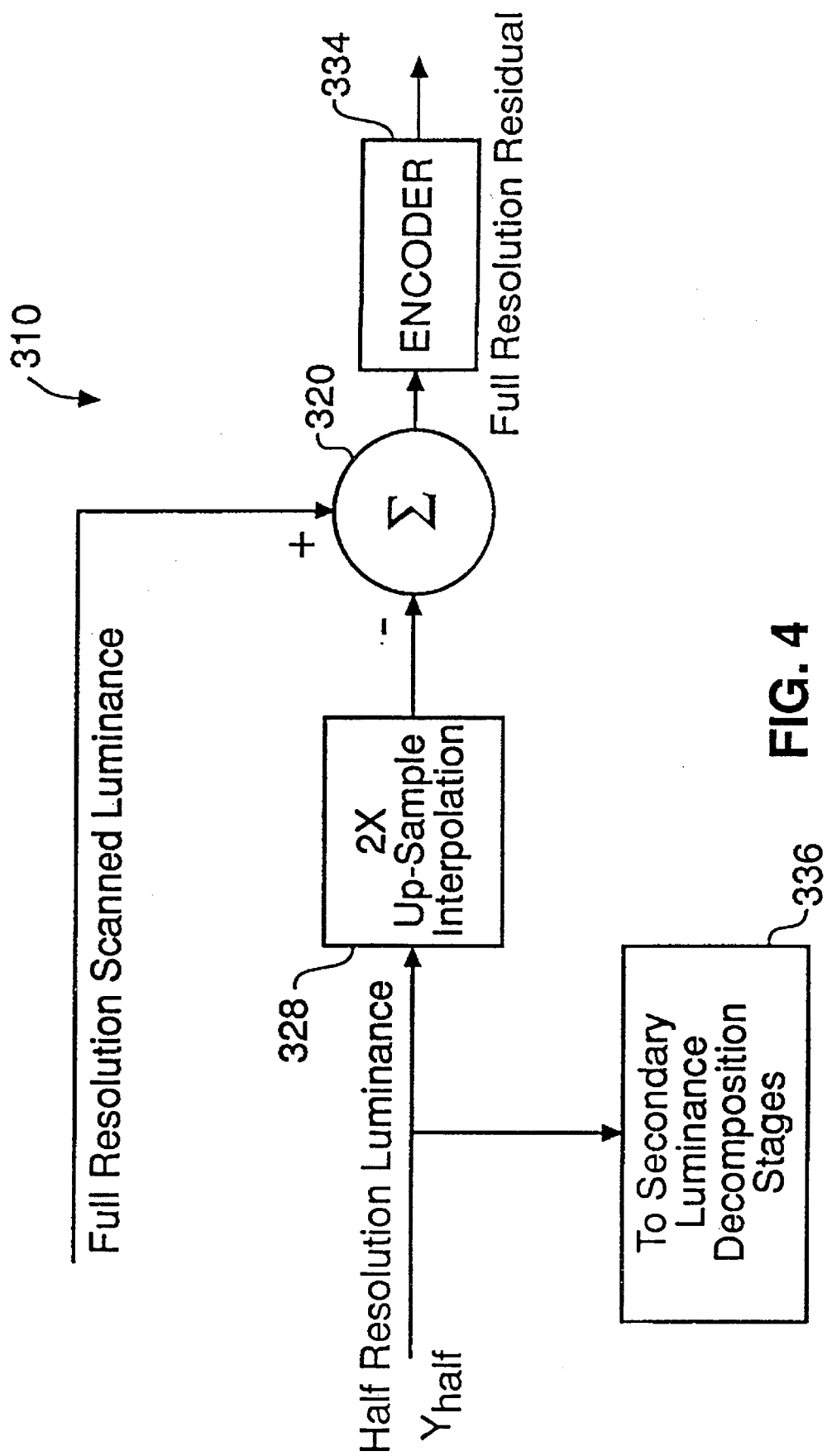
FIG. 4 is a block diagram of a signal processing system in accordance with still another embodiment of the invention.

In a fourth system in accordance with a fourth embodiment of the invention illustrated in FIG. 4, the luminance and color signals are processed in apparatus 310 and encoded through conventional methods to provide a high resolution residual signal for known image decomposition.

With reference to FIG. 4, the half resolution color signals are received by a color conversion apparatus, as hereinabove described, matrixed, and tonescale processed into a half resolution luminance signal and two half resolution chrominance signals. The half resolution luminance signal is conducted to an upsampling interpolator apparatus 328, as hereinabove described, and interpolated to full resolution. Concurrently, the half resolution luminance signal is conducted to secondary luminance decomposition stages 336 for further processing.

Combiner apparatus 320 subtracts the interpolated luminance signal, generated from the half resolution color signals, from the full resolution scanned luminance signal to provide a residual image Y component. An encoding apparatus 334, which may include a non-linear quantizer and/or Huffman or other encoder, forms an encoded residual image signal, from the Y component, used in an image compression algorithm particularly residual hierarchical image compression as previously described.

This system has the scanning speed advantages of the luma/RGB scanner, the compression and image recomposition advantages of storage and display apparatus, and provides corrected luminance tonescale for low resolution images without additional hardware. However compression capability may be reduced compared to previously described systems due to additional energy in the resulting residual and the highest resolution decoded image may have errors introduced by the scanned luminance signal.

Figure 5:
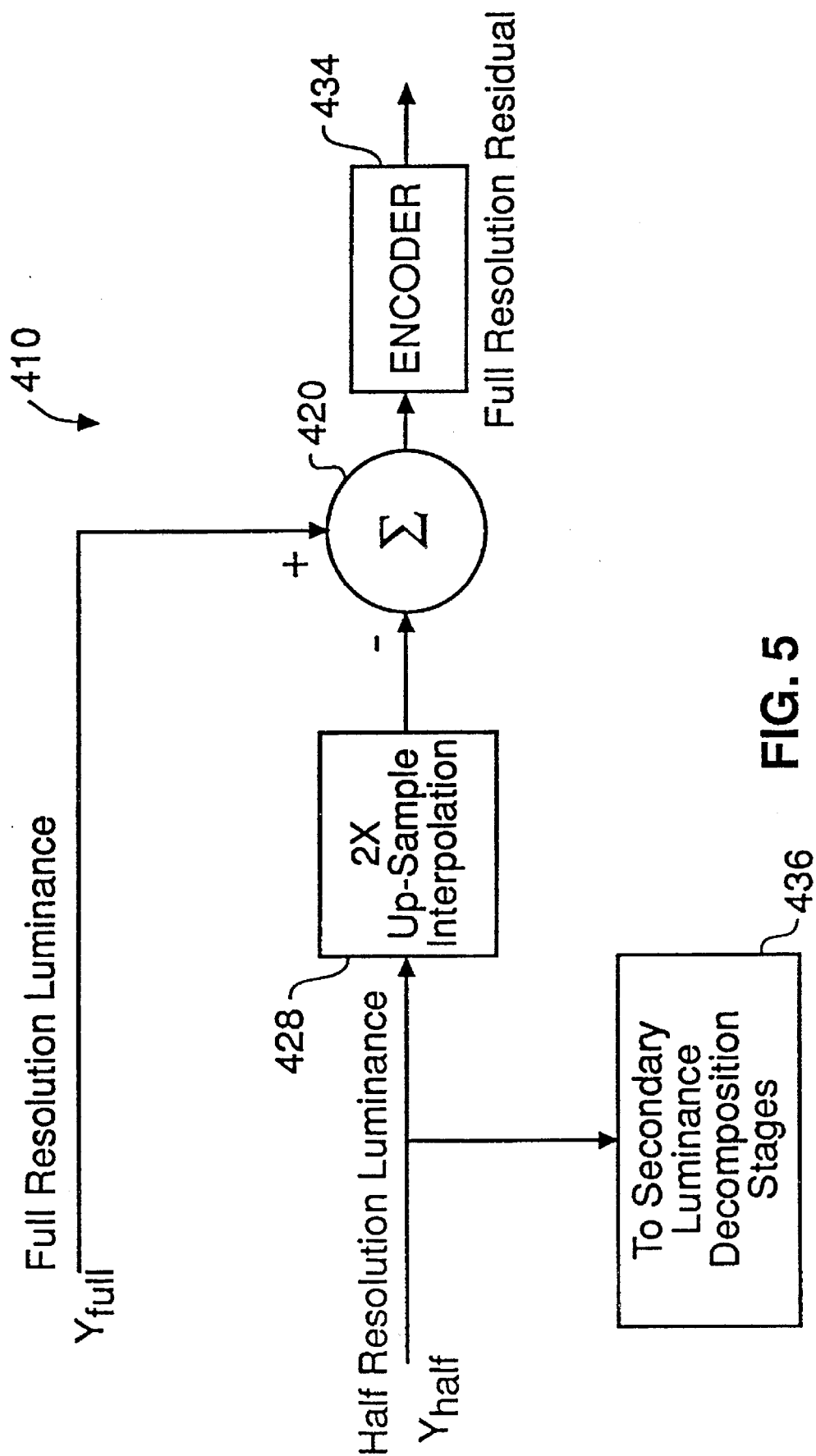
FIG. 5 is a block diagram of a signal processing system in accordance witch an additional embodiment of the invention.

FIG. 5 illustrates a fifth embodiment of the invention in a system referred to by reference numeral 410 wherein the encoded residual signal described with reference to the fourth embodiment 310 is enhanced by performing the full resolution luminance conversion described with reference to the first, second, or third embodiment 10, 110, 210, respectively, prior to the encoding.

In FIG. 5 the full resolution scanned luminance data has been received by converter apparatus, as hereinabove described, which adds red, green, and blue color data to the full resolution scanned luminance to generate a tonescale corrected luminance signal for further processing. Optional signal processing such as pre-tonescale, post, and pre-color processing, as hereinabove described, enhance the output signals of the system.

The tonescale corrected full resolution luminance signal is inputted into combiner apparatus 420 where the signal subtracts an interpolated full resolution luminance signal from interpolator apparatus 428 and generated by color conversion apparatus from scanned half resolution color signals as hereinabove described. In this embodiment, the luminance signal for all but the sharpest images is derived from half resolution RGB data and the tonescale accuracy of the luminance signal is enhanced. This luminance signal is encoded by methods utilized in known storage and display apparatus. The half resolution luminance signal is also conducted to secondary luminance decomposition stages 436 for further processing.

This system minimizes the possibility of luminance inaccuracies that may occur in the first, second, or third system 10, 110, 210, respectively, as the luminance for all but the sharpest images is derived from half resolution RGB data. Furthermore, because the full resolution scanned luminance is tonescale corrected and compared with the interpolated full resolution luminance that has approximately the same tonescale, the residual is lower energy and high resolution luminance errors are reduced.

Figure 6:
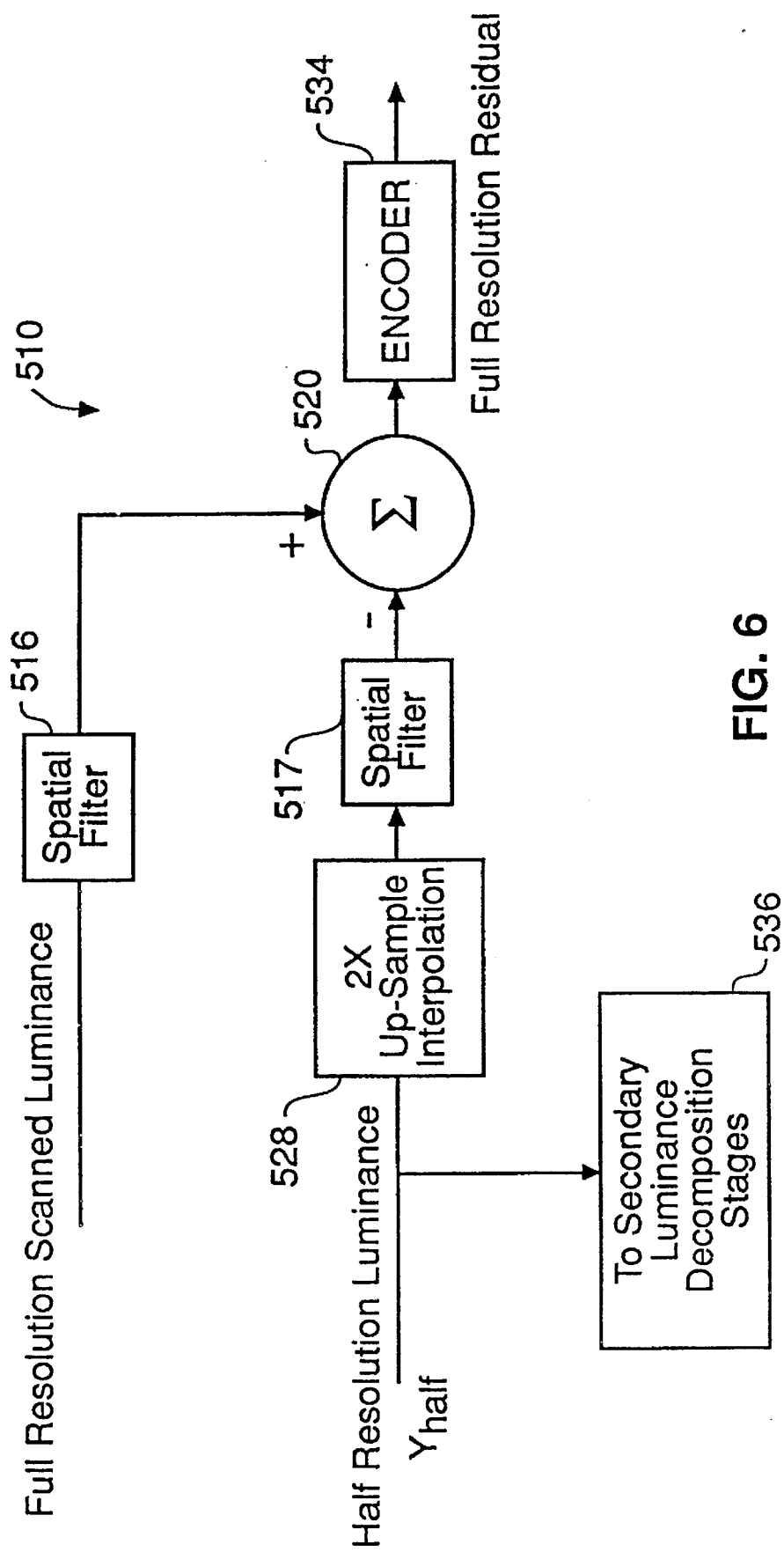
FIG. 6 is a block diagram of a signal processing system in accordance with a further embodiment of the invention.

As illustrated in FIG. 6, the scanned luminance signal and upsampled luminance signal of system 310 of the fourth embodiment of FIG. 4 have been enhanced, through the addition of spatial filter apparatus 516, 517. FIG. 6 illustrates a sixth system in accordance with an embodiment of the invention indicated by numeral 510 wherein spatial filter circuits remove the DC and low frequency content of both the full resolution scanned luminance signal and the upsampled tonescale correct full resolution luminance signal derived from half resolution scanned color signals.

In the embodiment 510 of FIG. 6, a first spatial filter apparatus 516, such as a low frequency rejection filter, receives the full resolution scanned luminance signal and removes the DC and low frequency content of the signal. A second detail extraction apparatus 517, receives the upsampled full resolution luminance signal from interpolator apparatus 528 and generated by color conversion apparatus, hereinabove described, and likewise removes the DC and low frequency content of the signal. The low frequency rejection filters 516, 517, are designed such that the total frequency response of the apparatus with the filters is similar to the response of the apparatus without the filters. This is possible because of the image difference required to form the residual image signal used in storage and display apparatus.

The tonescale properties of the half resolution and lower images are preserved through the use of half resolution RGB data which is used to form the half resolution luminance channel which is conducted to secondary luminance decomposition stages 536. The tonescale properties of the full resolution image are not contained in the residual.

This system has the speed advantages of the luma/RGB scanner, the compression and image recomposition advantages of storage and display apparatus and provides corrected luminance tonescale through a modified luminance channel encoder. Furthermore, it allows for direct coupling of scanned luminance (uncorrected) to the compression system.

Figure 7:
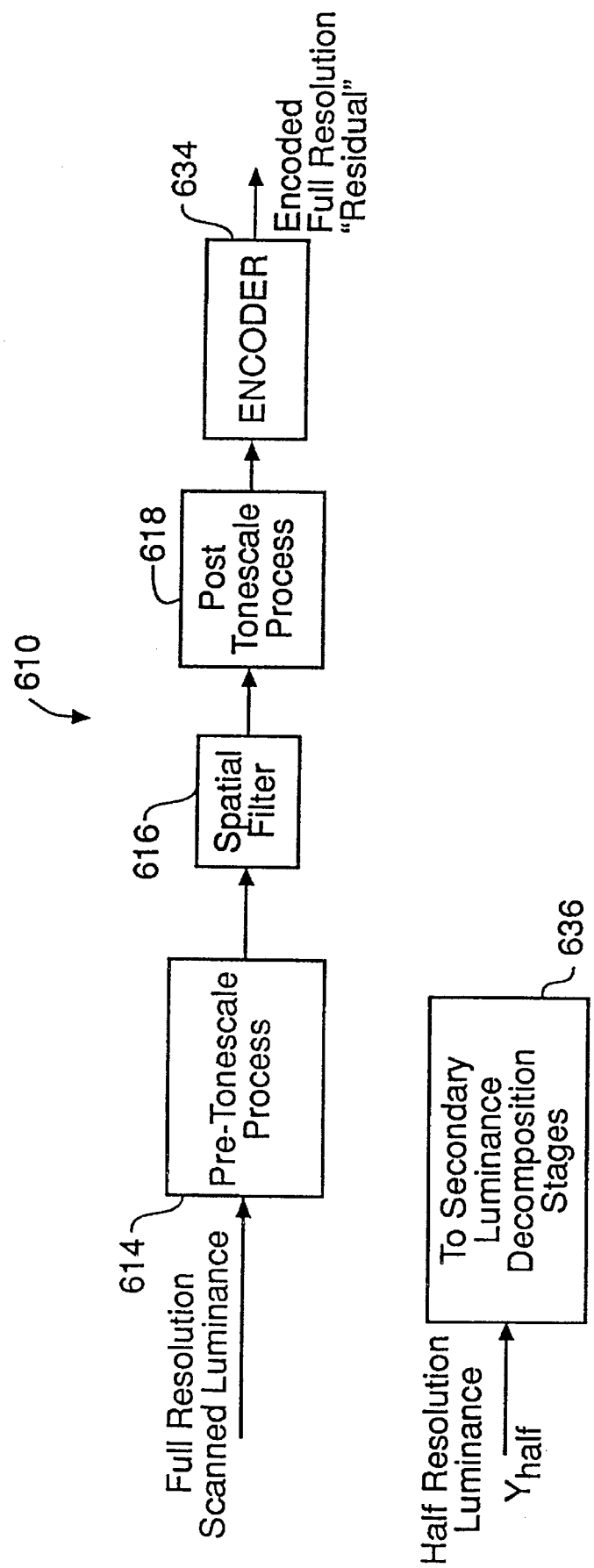
FIG. 7 is a block diagram of a signal processing system in accordance with a still further embodiment of the invention.

Another system, made in accordance with a seventh embodiment of the invention illustrated in FIG. 7, is indicated by numeral 610. In system 610, full resolution scanned luminance signals are received by pre-tonescale processor 614 and tonescale shaped or modified. The tonescale shaped scanned luminance signal is passed through a spatial filter apparatus 616, as hereinabove described, where DC and low frequency content is extracted from the luminance data. A post processor 618 receives the filtered luminance data and shapes the luminance signal as hereinabove described. The processed full resolution detail extracted signal is directly encoded by encoder apparatus 634 using known methods in known storage and display systems without combining input from the half resolution color scanned color signals to form the maximum resolution luminance residual.

The half resolution scanned color signals are received by a color conversion apparatus, as hereinabove described, to form a half resolution $YC_1C_2$ signal through the use of the conventional series of look-up tables and matrices. Reduced resolution luminance processing is derived from the half resolution Y data used in secondary luminance decomposition stages 636.

This system has the speed advantages of the luma/RGB scanner, the compression and image recomposition advantages of storage and display apparatus, and provides luminance tonescale with a reduced amount of hardware.

In all the hereinabove described embodiments, the signal output is decoded in the conventional manner, without the need for special filters ill the decoder.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope defined by the language of the appended claims.

Parts List 10. first system
14. pre-tonescale processor
16. extraction apparatus
18. post processor
20. combiner apparatus 24. pre-color processor
26. conversion apparatus
28. interpolator apparatus
110. second system
114. pre-tonescale processor
118. post processor
124. pre-color processor
126. conversion apparatus
132. converter apparatus
210. third system
214. pre-tonescale processor
216. extraction apparatus
218. post processor
220. combiner apparatus
224. pre-color processor
226. conversion apparatus
228. interpolator apparatus
232. converter apparatus
310. fourth system
320. combiner apparatus
328. interpolator apparatus
334. encoding apparatus
336. secondary luminance decomposition stages
410. fifth system
414. pre-tonescale processor
418. post processor
420. combiner apparatus
424. pre-color processor
428. interpolator apparatus
436. secondary luminance decomposition stages
510. sixth system
516. spatial filter apparatus
517. spatial filter apparatus
520. combiner apparatus
528. interpolator apparatus
534. encoding apparatus
610. seventh system
614. pre-tonescale processor
616. extraction apparatus
618. post processor
634. encoding apparatus

What is claimed is:

1. A system for use with film scanning apparatus generating full resolution luminance and half resolution color (RGB) image signals, and an encoding apparatus utilizing a full resolution luminance (Y) and two half resolution chrominance ($C_1, C_2$) signals to encode an image for hybrid residual-based hierarchical storage of full resolution tonescale corrected luminance signals together with sub-sampled half resolution chrominance signals and for providing high resolution digital images from the stored signals, said system characterized by:

means for signal processing the full resolution luminance signal and half resolution color signals received from said film scanning apparatus to directly generate a tonescale corrected full resolution scene luminance signal compatible with hybrid residual-based hierarchical image storage, said signal processing means comprising converter apparatus for modifying the scanned full resolution luminance signal by utilizing a combination of the scanned half resolution color signals and scanned luminance signal; and color conversion apparatus receiving the scanned half resolution color signals and converting the scanned color signals into two half resolution chrominance signals.

2. A system as claimed in claim 1 characterized by:

a pre-tonescale processor for processing scanned luminance signals to shape tonescale information in the scanned luminance signal prior to signal transmission to said converter apparatus.

3. A system as claimed in claim 1 characterized by:

a post processor for processing luminance signals received from said converter apparatus to shape tonescale information in the luminance signal.

4. A system as claimed in claim 1 characterized by:

a pre-color processor for processing scanned half resolution color signals to correct tonescale prior to signal transmission to said converter apparatus and said color conversion apparatus.

5. A system as claimed in claim 1 characterized by:

means for generating a half resolution luminance signal from the scanned half resolution color signals for use in image encoding and secondary luminance decomposition stages.

6. A system as claimed in claim 5 characterized by:

detail extraction apparatus receiving corrected full resolution luminance signals, extracting detail/sharpness information therefrom and providing a further refined digital luminance signal;

interpolator apparatus receiving and interpolating the half resolution luminance signal to a full resolution luminance signal; and combiner apparatus adding the further refined digital detail signal to the upsampled interpolated tonescale correct luminance signal to provide a tonescale corrected full resolution luminance signal.

7. A system as claimed in claim 6 characterized by:

a pre-tonescale processor for processing scanned luminance signals to shape tonescale information in the luminance signal prior to signal transmission to said converter apparatus.

8. A system as claimed in claim 6 characterized by:

a post processor for processing luminance signals received from said detail extraction apparatus to shape detail information in the luminance signal.

9. A system as claimed in claim 6 characterized by:

a pre-color processor for processing scanned half resolution color signals to correct tonescale prior to signal transmission to said converter apparatus and said color conversion apparatus.

10. A system as claimed in claim 5 characterized by:

interpolating apparatus for upsampling and converting the half resolution luminance signal to a full resolution signal;

combiner apparatus subtracting the interpolated luminance signal from the converted full resolution luminance signal;

encoding apparatus encoding the differenced full resolution luminance signal and the interpolated half resolution luminance signal to generate an encoded residual signal; and the half resolution luminance signal being directly encoded in secondary luminance decomposition stages.

11. A system as claimed in claim 10 characterized by:

a pre-tonescale processor for processing scanned luminance signals to shape tonescale information in the luminance signal prior to signal transmission to said converter apparatus.

12. A system as claimed in claim 10 characterized by:

a post processor for processing luminance signals received from said converter apparatus to shape tonescale information in the luminance signal.

13. A system as claimed in claim 6 characterized by:

interpolating apparatus for upsampling and converting the half resolution luminance signal to a full resolution signal;

combiner apparatus subtracting the interpolated luminance signal from the converted full resolution luminance signal;

encoding apparatus encoding the differenced full resolution luminance signal and the interpolated half resolution luminance signal to generate an encoded residual signal; and the half resolution luminance signal being directly encoded in secondary luminance decomposition stages.

14. A method for signal processing scanned full resolution luminance and half resolution color (RGB) signals to provide luminance information for image encoding compatible with hybrid residual-based hierarchical storage of full resolution tonescale corrected luminance signals together with sub-sampled half resolution chrominance signals and for providing high resolution digital images from the stored signals, said method characterized by:

processing the full resolution luminance signal and half resolution color signals received from a film scanning apparatus to directly generate a tonescale corrected full resolution scene luminance signal modifying the scanned full resolution luminance signal by utilizing a combination of the scanned half resolution color signals and scanned luminance signal; and converting the scanned half resolution color signals into two half resolution chrominance signals.

15. A method as claimed in claim 14 characterized by:

generating a half resolution luminance signal from the scanned half resolution color signals for image encoding and secondary image decomposition stages.

16. A method as claimed in claim 15 characterized by:

interpolating the half resolution luminance signal to a full resolution signal;

subtracting the interpolated luminance signal from the converted full resolution luminance signal;

encoding the differenced full resolution luminance signal and the interpolated half resolution luminance signal to generate a tonescale corrected full resolution scene luminance signal; and encoding the half resolution luminance signal directly in secondary luminance decomposition stages.

17. A method as claimed in claim 15 characterized by:

extracting detail/sharpness information from the scanned full resolution luminance signals to provide a tonescale shaped digital detail signal;

converting the half resolution scanned color signals into a half resolution luminance signal and two half resolution chrominance signals;

interpolating the half resolution luminance signal into a full resolution luminance signal; and adding the digital detail signal to the interpolated luminance signal to provide a tonescale corrected full resolution luminance signal.

18. A method as claimed in claim 15 characterized by:

converting the scanned color signals into a half resolution luminance signal and two half resolution chrominance signals;

interpolating the half resolution luminance signal to a full resolution signal;

subtracting the interpolated luminance signal from the full resolution scanned luminance signal;

encoding the differenced full resolution signal and the interpolated luminance signal to generate the tonescale corrected full resolution scene luminance signal; and encoding the half resolution luminance signal directly in secondary luminance decomposition stages.

19. A method as claimed in claim 15 characterized by:

filtering the scanned full resolution signal to remove low frequency tonescale information from the signal;

interpolating the half resolution luminance signal; and filtering the interpolated luminance signal to likewise remove low frequency tonescale information from the signal.

20. A method as claimed in claim 15 characterized by:

processing the scanned full resolution luminance signal to shape tonescale information;

extracting detail/sharpness information from the processed scanned luminance signal;

shaping tonescale information in the processed luminance signal;

encoding the processed full resolution luminance signal and forming a base residual signal;

converting the scanned color signals into two half resolution chrominance signals and a half resolution luminance signal; and encoding the half resolution luminance signal directly in secondary luminance decomposition stages.

21. A system for use with film scanning apparatus generating full resolution luminance and half resolution color (RGB) image signals, and an encoding apparatus utilizing a full resolution luminance (Y) and two half resolution chrominance ($C_1, C_2$) signals to encode an image for hybrid residual-based hierarchical storage of full resolution tonescale corrected luminance signals together with sub-sampled half resolution chrominance signals and for providing high resolution digital images from the stored signals, said system characterized by:

means for signal processing the full resolution luminance signals and half resolution color signals received from said film scanning apparatus to directly generate a tonescale corrected full resolution scene luminance signal compatible with hybrid residual-based hierarchical image storage;

means for generating two half resolution chrominance signals from the scanned half resolution color signals for image encoding; and means of generating a half resolution luminance signal from the scanned half resolution color signals for image encoding.

22. A system as claimed in claim 21 wherein the half resolution luminance signal is used in the generation of the tonescale corrected full resolution scene luminance signal.

23. A system as claimed in claim 21 characterized by:

detail extraction apparatus receiving the scanned full resolution luminance signals, extracting detail/sharpness information therefrom and providing a tonescale shaped digital detail signal;

color conversion apparatus receiving the scanned half resolution color signals and converting the scanned color signals into a half resolution luminance signal and two half resolution chrominance signals;

interpolator apparatus receiving and interpolating the half resolution luminance signal into a full resolution luminance signal; and combiner apparatus adding the digital luminance signal to the interpolated luminance signal to provide a tonescale corrected full resolution luminance signal.

24. A system as claimed in claim 23 characterized in that:

said detail extraction apparatus is a digital filter circuit.

25. A system as claimed in claim 23 characterized by:

a pre-tonescale processor for processing scanned luminance signals to shape tonescale information in the scanned luminance signal prior to signal transmission to said detail extraction apparatus.

26. A system as claimed in claim 23 characterized by:

a post processor for processing luminance signals received from said detail extraction apparatus to shape detail information in the luminance signal.

27. A system as claimed in claim 23 characterized by:

a pre-color processor for processing scanned half resolution color signals to correct tonescale and color prior to signal transmission to said color conversion apparatus.

28. A system as claimed in claim 23 characterized by:

interpolating apparatus for upsampling and converting the half resolution luminance signal to a full resolution signal;

combiner apparatus subtracting the interpolated luminance signal from the converted full resolution luminance signal;

encoding apparatus encoding the differenced full resolution luminance signal and the interpolated half resolution luminance signal to generate an encoded residual signal; and the half resolution luminance signal being directly encoded in secondary luminance decomposition stages.

29. A system as claimed in claim 21 characterized by:

color conversion apparatus receiving the scanned half resolution color signals and converting the scanned color signals into a half resolution luminance signal and two half resolution chrominance signals;

interpolating apparatus for interpolating the half resolution luminance signal to a full resolution signal;

combiner apparatus subtracting the interpolated luminance signal from the full resolution scanned luminance signal to form a residual signal;

encoding apparatus encoding the residual signal to generate an encoded residual signal; and the half resolution luminance signal being directly encoded in secondary luminance decomposition stages.

30. A system as claimed in claim 29 characterized by:

first spatial filter apparatus receiving the scanned full resolution signal and filtering the scanned full resolution signal; and second spatial filter apparatus receiving the interpolated luminance signal and filtering the upsampled luminance signal.

31. A system as claimed in claim 30 characterized in that:

said first and second spatial filter apparatus are high pass spatial filter circuits.

32. A system as claimed in claim 21 characterized by:

a pre-tonescale processor for processing scanned full resolution luminance signal to shape tonescale information in the luminance signal;

spatial filter apparatus receiving the processed scanned luminance signal and extracting detail/sharpness information therefrom;

a post processor for processing detail signals received from said spatial filter apparatus to shape detail information in the detail signal;

encoding apparatus encoding the processed full resolution luminance signal and forming an encoded signal; and the half resolution luminance signal being directly encoded in secondary luminance decomposition stages.

33. A method for signal processing scanned full resolution luminance and half resolution color (RGB) signals to provide luminance information for image encoding compatible with hybrid residual-based hierarchical storage of full resolution tonescale corrected luminance signals together with sub-sampled half resolution chrominance signals and for providing high resolution digital images from the stored signals, said method characterized by:

processing the full resolution luminance signals and half resolution color signals received from film scanning apparatus to directly generate a tonescale corrected full resolution scene luminance signal;

generating two half resolution chrominance signals from the scanned half resolution color signals for image encoding; and generating a half resolution luminance signal from the scanned half resolution color signals for image encoding.

34. A method as claimed in claim 33 wherein the half resolution luminance signal is used in the generation of the tonescale corrected full resolution scene luminance signal.

35. A method as claimed in claim 33 characterized by:

extracting detail/sharpness information from full resolution luminance signals to provide a further refined digital detail signal;

interpolating the half resolution luminance signal to a full resolution luminance signal; and adding the further refined digital detail signal to the interpolated luminance signal to provide a tonescale corrected full resolution luminance signal.

* * * * *